(12) United States Patent
Arunmozhi

(10) Patent No.: US 12,071,106 B2
(45) Date of Patent: Aug. 27, 2024

(54) ACOUSTIC EMISSION BASED DEVICE CONTROL

(71) Applicant: Motional AD LLC, Boston, MA (US)

(72) Inventor: Ashwin Arunmozhi, Monroeville, PA (US)

(73) Assignee: Motional AD LLC, Boston, MA (US)

( * ) Notice: Subject to any disclaimer, the term of this patent is extended or adjusted under 35 U.S.C. 154(b) by 436 days.

(21) Appl. No.: 17/573,284

(22) Filed: Jan. 11, 2022

(65) Prior Publication Data

US 2023/0192036 A1    Jun. 22, 2023

Related U.S. Application Data

(60) Provisional application No. 63/292,782, filed on Dec. 22, 2021.

(51) Int. Cl.
| | | |
|---|---|---|
| *B60S 1/04* | (2006.01) | |
| *B60S 1/08* | (2006.01) | |
| *B60S 1/16* | (2006.01) | |
| *G01S 15/46* | (2006.01) | |

(52) U.S. Cl.
CPC .............. *B60S 1/0862* (2013.01); *B60S 1/16* (2013.01); *G01S 15/46* (2013.01)

(58) Field of Classification Search
CPC .. B60S 1/0862; B60S 1/16; B60S 1/04; G01S 15/46
USPC .......................................... 180/271; 318/443
See application file for complete search history.

(56) References Cited

U.S. PATENT DOCUMENTS

| | | | | |
|---|---|---|---|---|
| 7,983,803 | B2 * | 7/2011 | Willey | B60S 1/0818 |
| | | | | 701/1 |
| 11,027,706 | B2 * | 6/2021 | Herzinger | B60S 1/56 |
| 11,180,117 | B2 * | 11/2021 | Maharshi | B60S 1/0848 |
| 11,708,052 | B2 * | 7/2023 | Yamauchi | B60S 1/0822 |
| | | | | 15/250.01 |
| 11,912,244 | B1 * | 2/2024 | Lagina | B60S 1/0477 |
| 2013/0145839 | A1 | 6/2013 | Niemann et al. | |

(Continued)

FOREIGN PATENT DOCUMENTS

| | | |
|---|---|---|
| CN | 212556158 | 2/2021 |
| EP | 3766746 | 1/2021 |

(Continued)

OTHER PUBLICATIONS

[No. Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

*Primary Examiner* — Toan C To
(74) *Attorney, Agent, or Firm* — Fish & Richardson P.C.

(57) ABSTRACT

Provided are methods for acoustic emission based device control. Some methods described also include receiving information associated with a first acoustic emission sensor, a second acoustic emission sensor, and a third acoustic emission sensor is received. In embodiments, the information corresponds to an event. In accordance with the first, second, and third acoustic emission sensor information, the first, second, and third timestamps, and a geometry of the surface, a unit vector is calculated from each acoustic emission sensor in the direction of the event's origin. Parameters are calculated based on the unit vectors. Systems and computer program products are also provided.

20 Claims, 10 Drawing Sheets

(56) References Cited

U.S. PATENT DOCUMENTS

| | | | |
|---|---|---|---|
| 2016/0250997 A1 | 9/2016 | Toda | |
| 2020/0353896 A1* | 11/2020 | Sugimoto | B60S 1/0452 |
| 2021/0323505 A1* | 10/2021 | Bojjanapalli | B60S 1/26 |
| 2023/0050203 A1* | 2/2023 | Amagasa | B60S 1/0896 |
| 2024/0140364 A1* | 5/2024 | Schaeuble | B60S 1/0896 |

FOREIGN PATENT DOCUMENTS

| | | |
|---|---|---|
| JP | 2017-138282 | 8/2017 |
| JP | 2019-168432 | 10/2019 |
| KR | 10-2020-0133390 | 11/2020 |
| KR | 10-2023-0035147 | 3/2023 |

* cited by examiner

ACOUSTIC EMISSION BASED DEVICE CONTROL

BACKGROUND

A vehicle, such as an autonomous vehicle, operates across a variety of environmental conditions. Environmental conditions generally refer to a state of the environment. Environmental conditions generally describe temperature, wind, precipitation, debris, and the like. Environmental conditions can dirty or otherwise degrade sensors and devices of a vehicle.

DETAILED DESCRIPTION

Figure 1:
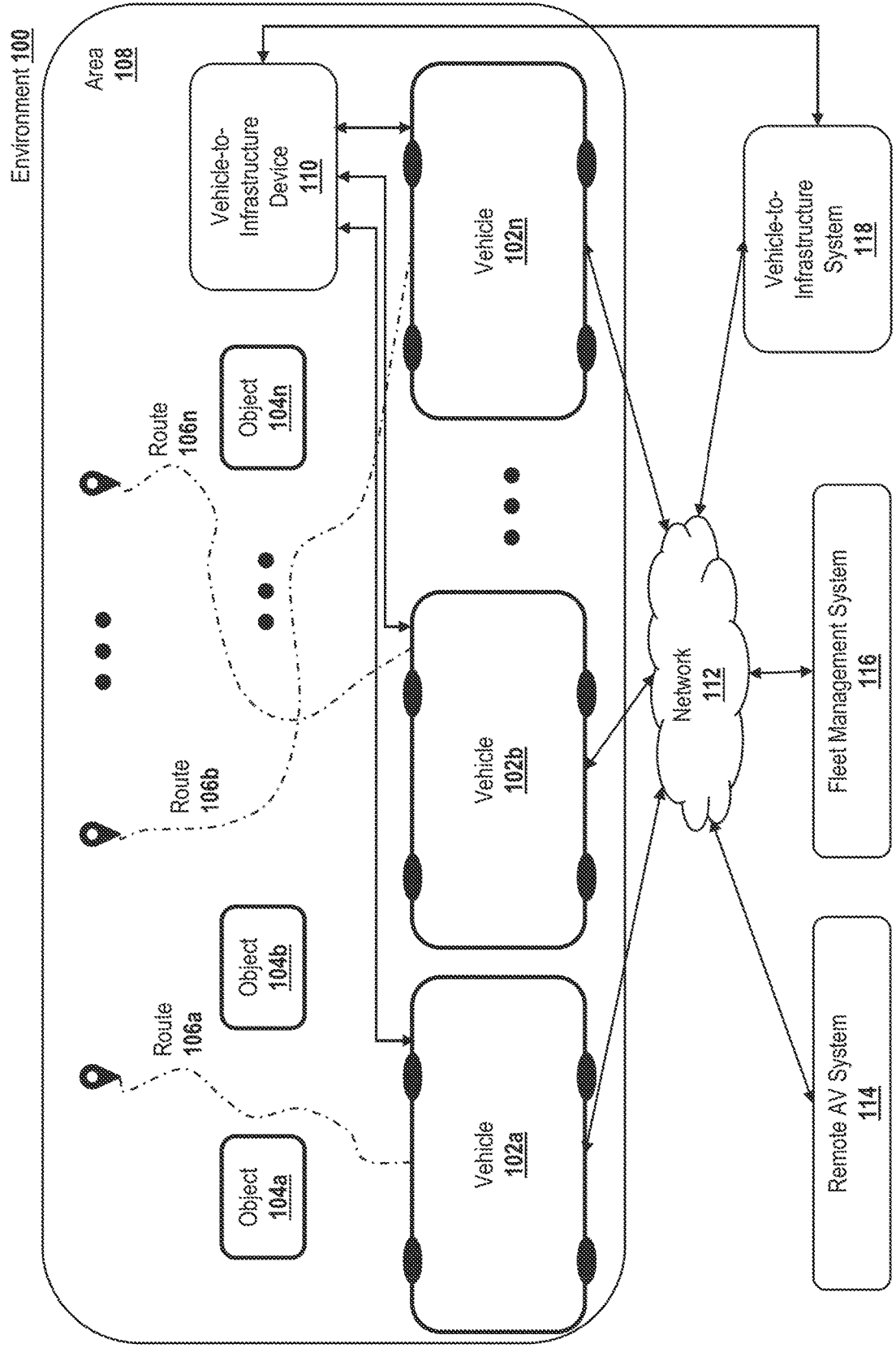
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

GENERAL OVERVIEW

In some aspects and/or embodiments, systems, methods, and computer program products described herein include and/or implement acoustic emission based device control. A vehicle (such as an autonomous vehicle) can have multiple sensors mounted at different locations of the vehicle. Sensors are mounted into the structure of at least one device, such as an arm of a wiper blade assembly. In embodiments, the wiper blade assembly is associated with a windshield (e.g., front and rear windshields), side windows (e.g., driver and passenger windows), sensor housings (e.g., LiDAR, camera, and radar lens/covers), light housings or covers, and the like. During environmental conditions where particles collide with a surface of the vehicle, the sensors mounted on the at least one device can detect acoustic emissions (e.g., vibrations) from the particle collisions with the surface, wherein the wiper blade assembly is adjacent to or in physical contact with the surface. The acoustic emissions captured by the sensors are used to map the acoustic emissions to parameters associated with an environmental condition. Upon activation (e.g., clearing a surface with the cleaning device; operation of the wiper blade used to clear a surface) of the device assembly, the acoustic emissions may also be used to detect degradation of the device assembly, including the device, a blade, or contamination of a surface cleaned by the assembly. In response to detection of degradation or contamination, other cleaning methods may be used.

By virtue of the implementation of systems, methods, and computer program products described herein, techniques for acoustic emission based device control. Some of the advantages of these techniques include precise detection of environmental condition parameters (e.g., rainfall rates). Moreover, the environmental condition parameters are calculated at a very fine (e.g., per car-basis) level, enabling more precise operation of vehicle functionality that is based on environmental parameters. Additionally, the present techniques enable wiper-based cleaning methods that do not abrasively damage optical surfaces and optical thin films, e.g. AR coatings. In examples, a determination of when abrasive damage may occur is made, and operation of the AV (e.g., components of the AV) avoids the abrasive damage.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
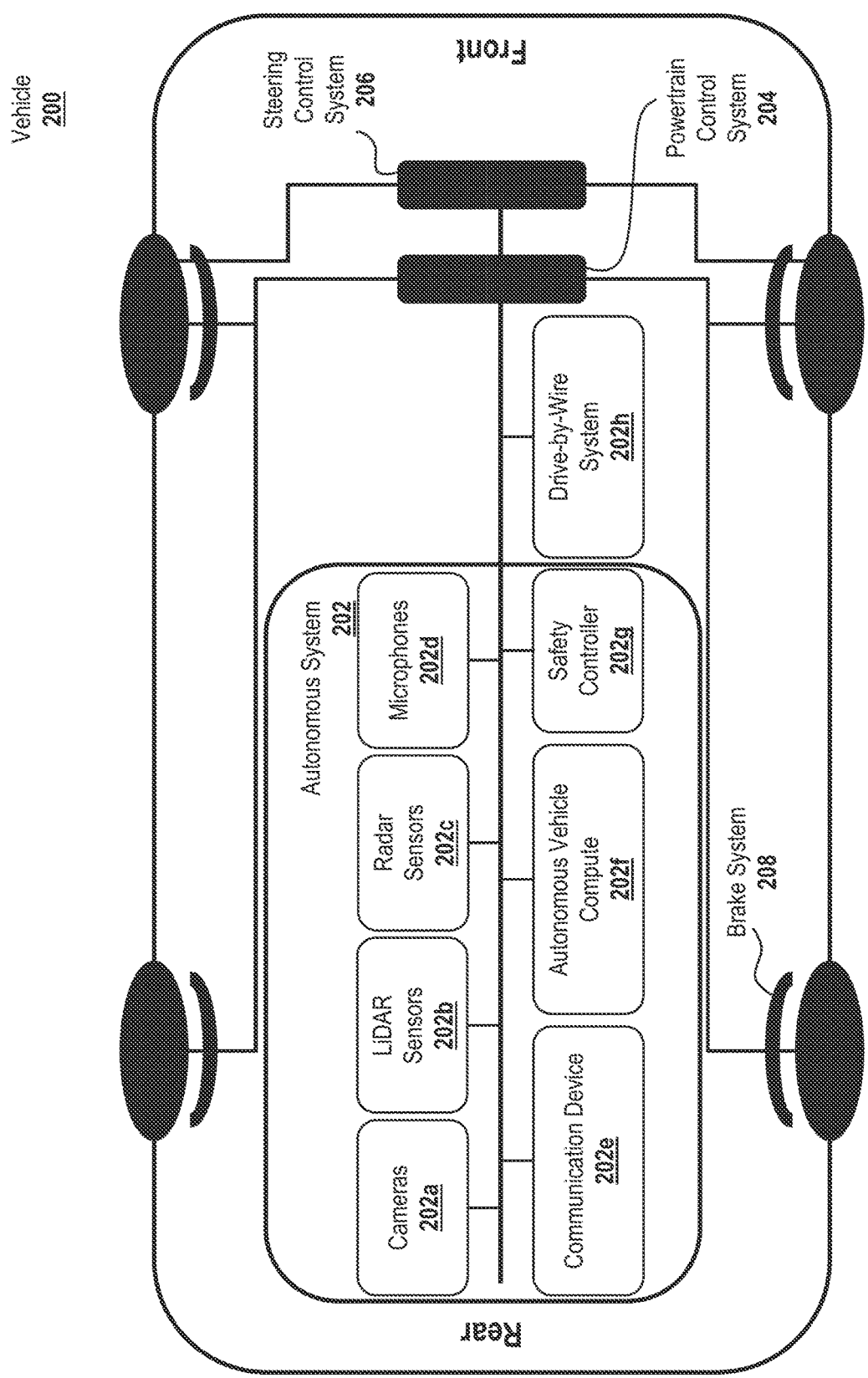
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
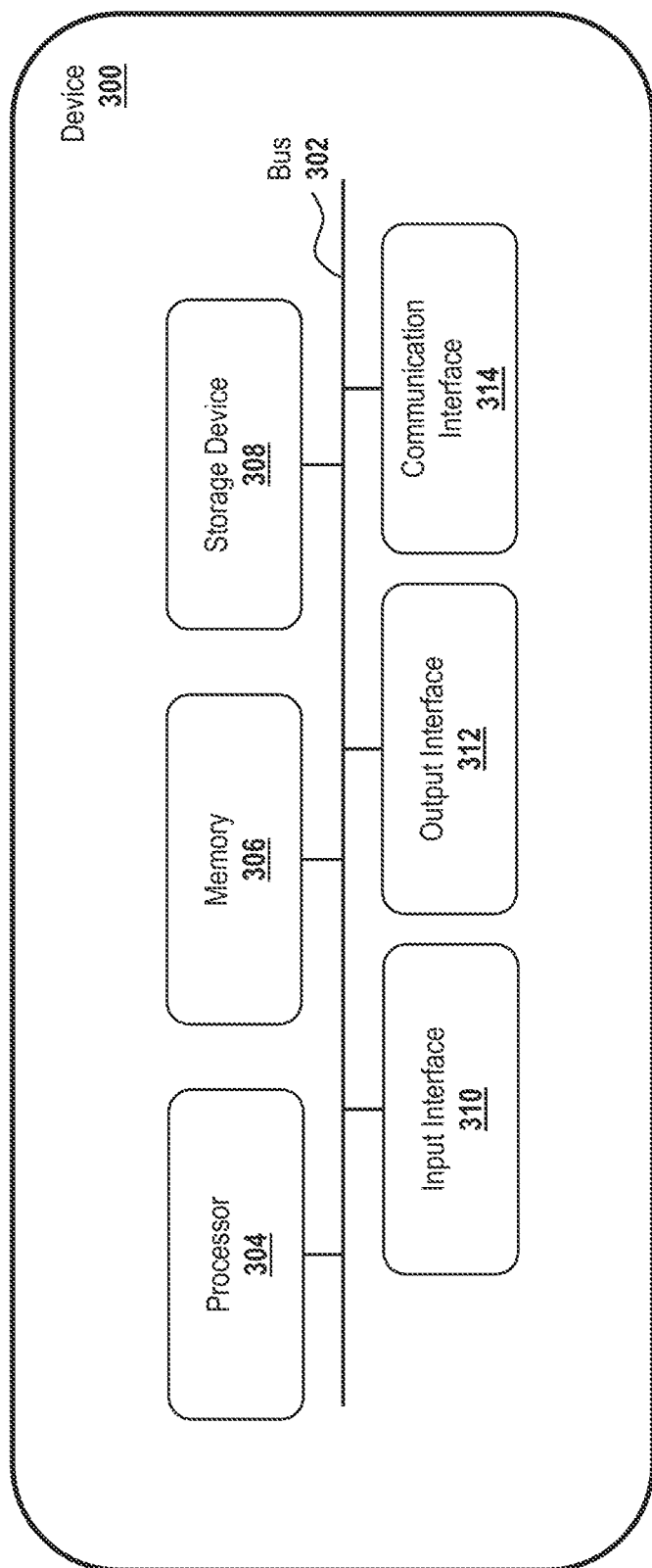
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via a communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
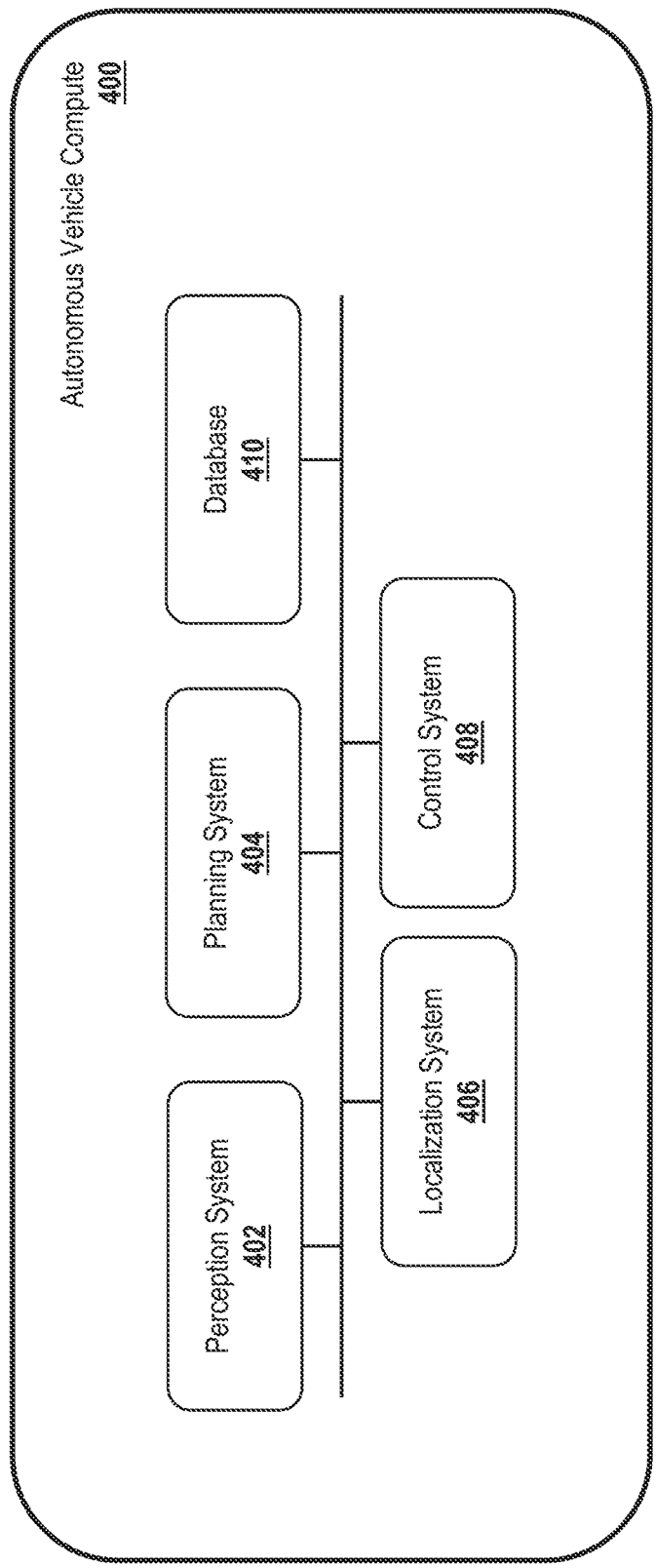
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like).

In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
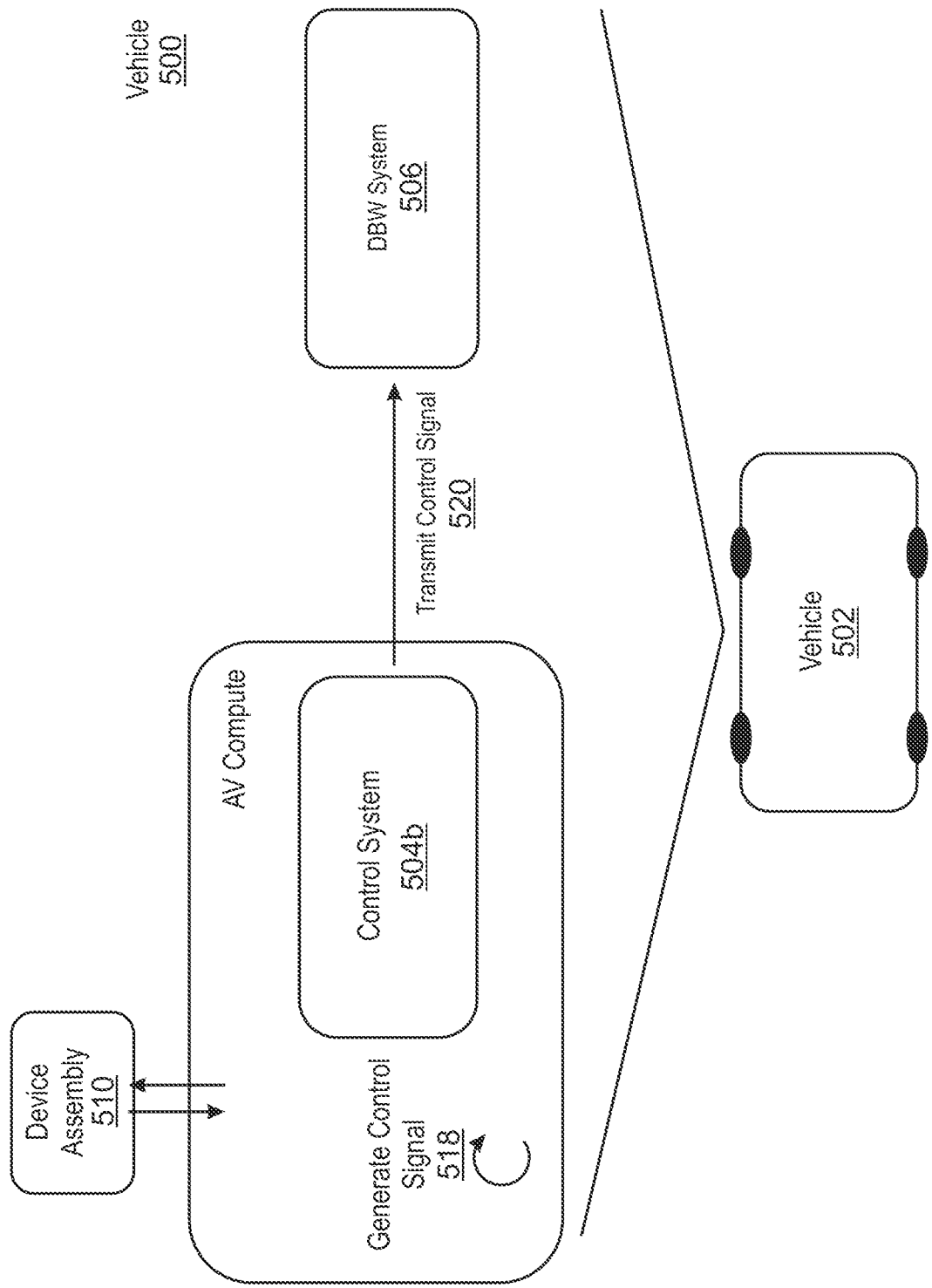
FIG. 5 are diagrams of an implementation of a process for acoustic emission based device control.

Referring now to FIG. 5, illustrated are diagrams of an implementation 500 of a process for acoustic emission based device control. In some embodiments, implementation 500 includes device assembly 510. In an embodiment, the device assembly is a wiper blade assembly (e.g., wiper blade assembly 600 of FIG. 6) located adjacent to or in physical contact with a windshield (e.g., surface). In examples, the device assembly is a wiper blade assembly (e.g., wiper blade assembly 900 of FIG. 9) located adjacent to or in physical contact with a LiDAR sensor cover. In examples, the device assembly is a wiper blade assembly (e.g., wiper blade assembly 900 of FIG. 9) located adjacent to or in physical contact with a camera sensor cover. In examples, the device assembly is a wiper blade assembly (e.g., wiper blade assembly 900 of FIG. 9) located adjacent to or in physical contact with a headlight lens.

Generally, the device assembly includes a support member (e.g., arm) and a cleaning member (e.g., blade). In the example of a windshield wiper blade assembly, the support member is one or more arms that rotate in a repetitive motion. A cleaning member is one or more blades attached to the one or more arms that oscillate. The blades are located near or in physical contact with a surface. In operation, the oscillating arms cause the blades to wipe or otherwise clear the surface.

In embodiments, sensors associated with the device assembly capture acoustic emissions that occur on the surface, device assembly, or any combinations thereof. Generally, the acoustic emissions are vibrations captured in response to a collision event. Parameters associated with the environmental conditions are calculated. In the example of FIG. 5, the acoustic emissions captured at the device assembly 510 are used to generate a control signal 518 at the control system 504b. The control signal is transmitted at reference number 520 to a drive by wire system. In embodiments, the drive by wire system is used to control operation of the vehicle 502. In embodiments, a control signal is transmitted to the device assembly 510 is control operation of the device assembly.

Generally, the present techniques enable an improved rain level detection resolution. The present techniques mitigate the impact of parameters such as, droplet size, droplet spacing, rain rate, droplet removal rate, etc., on various types of sensors such as cameras and LIDARs. The present techniques enable detection of the parameters, and in turn a determination of whether a vehicle can safely operate or whether the environment is unsafe and thus out of scope for vehicle operation. Moreover, the present techniques eliminate abrasive damage due to wiper based cleaning of vehicle surfaces, such as optical surfaces and optical thin films (e.g. anti-reflective (AR) coatings). Traditionally, abrasive particles stick to optical surfaces and upon activation of a wiper blade assembly, the particles are moved along the optical surface, resulting in abrasive wear on optical surfaces. The present techniques detect and measure abrasive contamination of a surface, and enable alternative cleaning techniques in response to potential abrasion during wiper blade based cleaning. In embodiments, alternative cleaning techniques include fluid-based cleaning methods. For example, washer fluid is sprayed using a nozzle onto a surface. Compressed air blows onto or across the surface at high velocities to remove the washer fluid droplets, if any.

Figure 6:
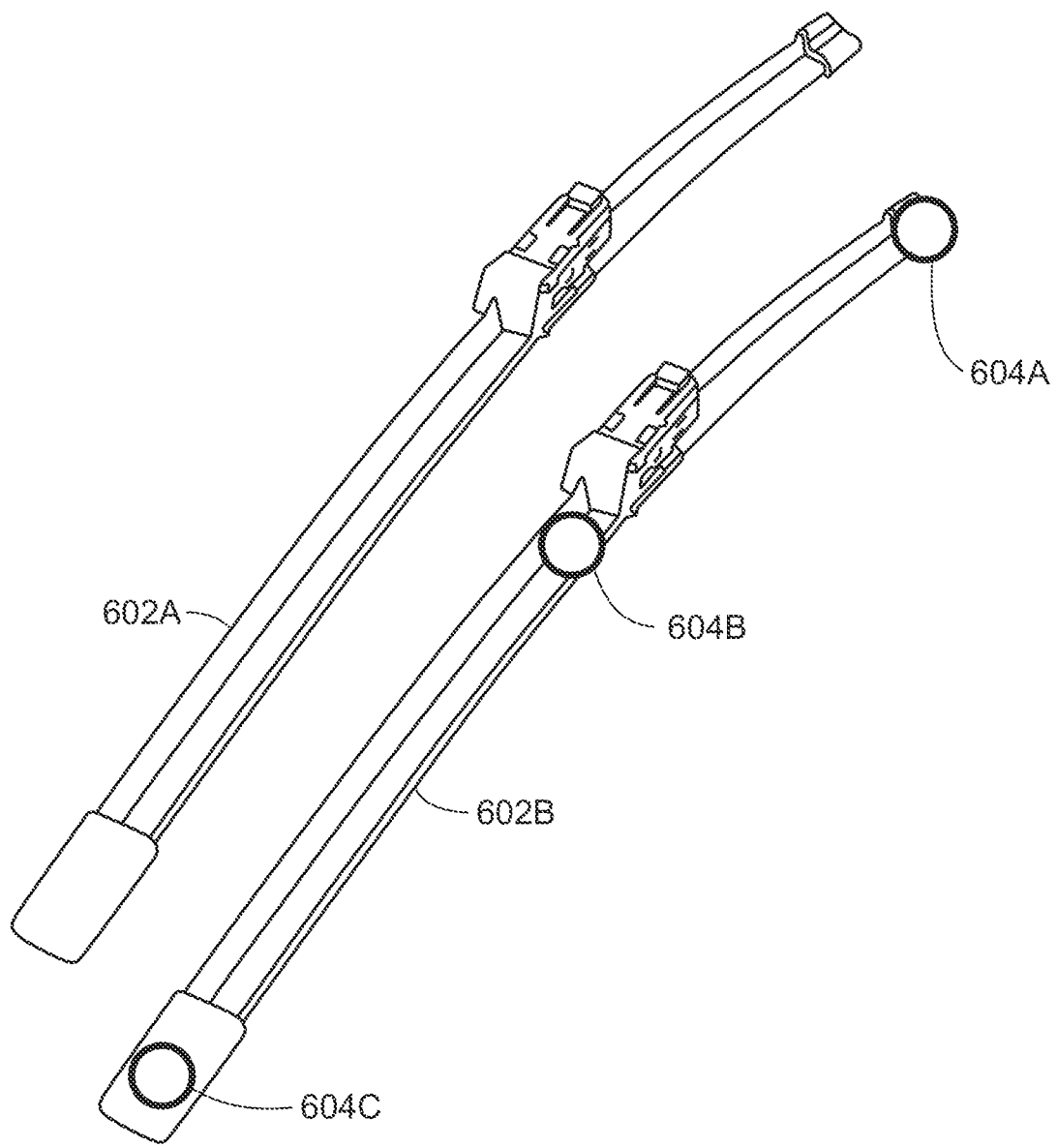
FIG. 6 is an illustration of a wiper blade assembly with a number of sensors.

FIG. 6 is an illustration of a wiper blade assembly 600 with a number of sensors. In the example of FIG. 6, the wiper blade assembly 600 includes a motor (not illustrated) that is controlled based on, at least in part acoustic emissions. In the example of FIG. 6, a first wiper arm 602A and a second wiper arm 602B are illustrated. The second wiper arm 602B includes a first sensor 604A, a second sensor 604B, and a third sensor 604C (collectively referred to as sensors 604). In embodiments, the sensors 604 are piezoelectric sensors. The sensors 604 are mounted into the arms 602 of the wiper blade assembly. In examples, the sensors 604 are embedded or otherwise coupled with the arms 602 such that vibrations that impact the arms 602, wiper blade, or surface are detected by the sensors 604.

In embodiments, particles (e.g., rain, debris, other environmental contaminants) collide with one or more surfaces and assemblies of the vehicle. The sensors 604 capture vibration on the surfaces and assemblies in response to particle collisions. In examples, vibrations are created in response to the impact of rain droplets on a windshield of the vehicle. The vibrations ultimately are captured by the sensors. In embodiments, the parameters vary according to vibration intensities as detected by the sensors 604. Accordingly, the detected vibrations are used to calculate parameters associated with the environment, such as rainfall rates, frequency of rainfall, size of droplets, rain droplet spread, and the like. In embodiments, a database stores a mapping of vibration patterns as detected in the acoustic emissions to one or more of the parameters associated with the environment. In embodiments, the wiper blade assembly is controlled based on the calculated parameters. In embodiments, the vehicle is controlled based on the calculated parameters. In embodiments, the database of vibration information is training data that is used to train a neural network that predicts environmental parameters based on vibration information.

Figure 7:
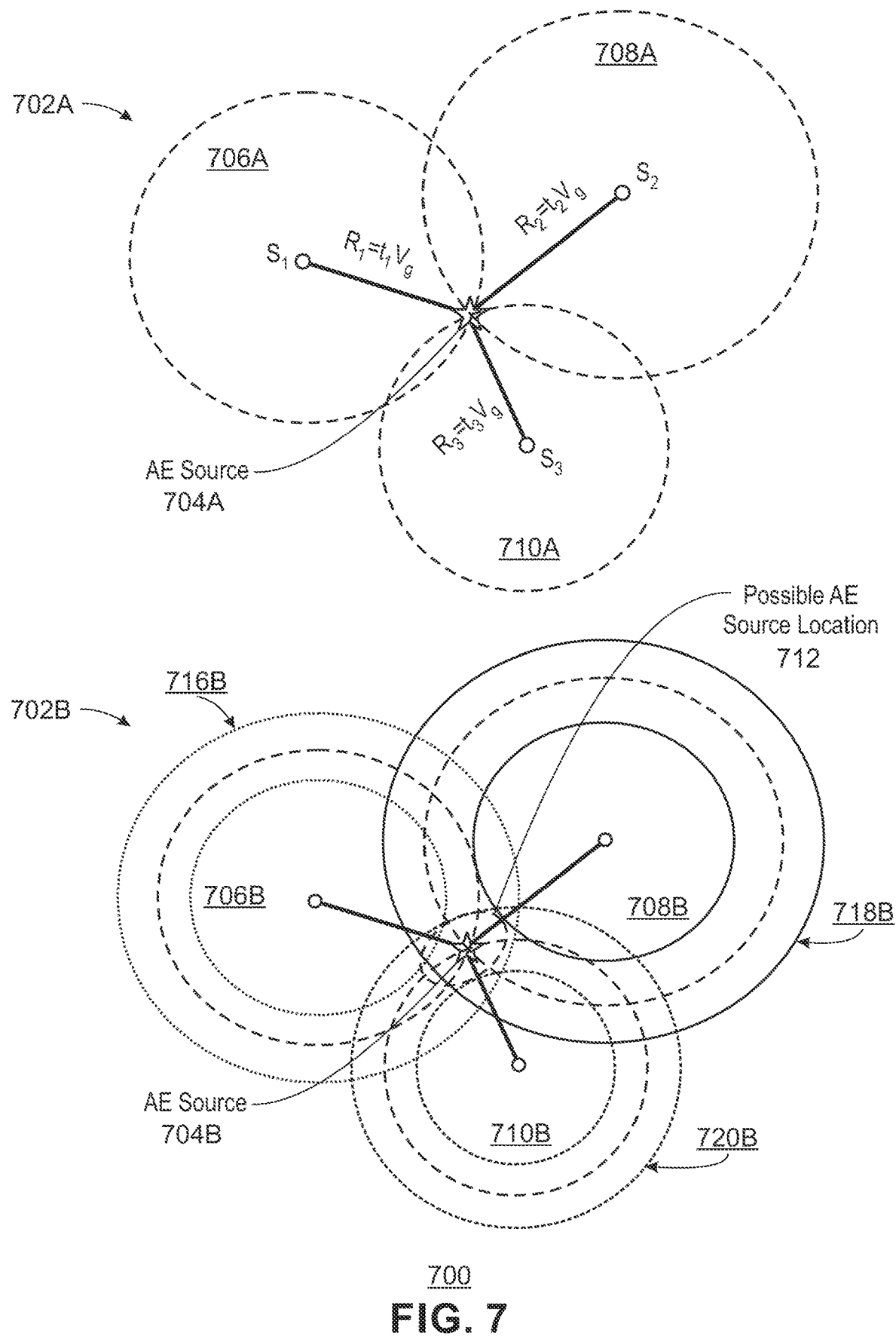
FIG. 7 is an example of acoustic triangulation with multiple sources to locate the position.

FIG. 7 is an example of acoustic triangulation with multiple sources to locate the position. In the example of FIG. 7, acoustic triangulation is used to calculate the rain rates. The sensors are mounted at different locations on a same surface. In embodiments, the sensors are mounted at different locations resembling a pyramid or a triangle depending on the surface geometry on which it is mounted. The sensors are communicatively coupled with a timing system that measures an exact time that each sensor (e.g., sensor 604) detects a valid event. In embodiments, the timing system integrates several operations of the vehicle using a timer, enabling time based synchronization of vehicle operations. In embodiments, triangulation is used for measurement and calibration purposes. Both the geometry of the surface, arrangement and the arrival time of the events will be used by the triangulation software to calculate a unit vector in the direction of the event's origin. The absolute coordinates of the source of the acoustic emission corresponding to the event are then calculated.

In embodiments, a valid event is the generation of acoustic emissions in response to precipitation. During operation of the vehicle, water or debris not associated with rainfall can collide with the vehicle. This occurs, for example, when water and mud is splashed onto the vehicle from a standing area of water, such as a puddle. This can also occur, for example, when sprinkler systems cause water to impact the vehicle. Events that originate from standing water, sprinklers, and the like are not valid events. In embodiments, the present techniques enable a backup system for verification that the event represents rainfall (e.g., is a valid event).

In the example of FIG. 7, at reference number 702 a number of equations associated with triangulation are illustrated. A first circle 706A has a center S1 that represents a source location of a detected event by a first sensor. A second circle 708A has a center S2 that represents a source location of a detected event by a second sensor. A third circle 710A has a center S3 that represents a source location of a detected event by a third sensor. Each source location is processed using triangulation techniques. In particular, the following equation is used to determine a possible acoustic emission source location:

$$R_i = t_i V_g$$

where i refers to the $i^{th}$ sensor, t represents a time associated with the detected event at the $i^{th}$ sensor, and $V_g$ represents a wave velocity.

In the example of FIG. 7, at reference number 702B calculation of the possible acoustic emission source location 712 is illustrated. Each sensor is used to calculate a number of possible locations where the detected event occurred. These possible locations are illustrated as rings 716B, 718B, and 720B. The intersection of the possible locations 716B, 718B, and 720B occurs at the possible acoustic emission source location 712. Generally, the actual acoustic emission source location 704B is located within the possible acoustic emission source location 712 calculated according to the illustrated triangulation. The calculation of locations associated with detected events enables a determination of environmental parameters as discussed above.

In embodiments, the wiper blade assembly is controlled based on the calculated parameters. A blade of the wiper blade assembly wipes water, snow, wiper fluid, and other liquids or debris away from the surface. In examples, the wiper blade assembly has one or more speeds (e.g., low, medium, or high speed) at which a motor drives an arm of the wiper blade assembly to oscillate across a surface of the vehicle, causing the blade to wipe the surface. The present techniques enable controlling a speed of the wiper blade assembly based on the vibrations detected by the sensors. In particular, the speed of the wiper blade assembly is set based on the actual rain rate and droplet size calculated through the acoustic emissions.

In embodiments, the acoustic emissions are used to determine degradation of the wiper blade assembly. In examples, autonomous vehicles operate for an extended period of time without a human driver. In some cases physical wear and tear of wiper blade assemblies is unnoticed until complete obstruction of the surface occurs. The present techniques enable detection of wear and tear on wiper blade assemblies, including the blades used to wipe corresponding surfaces. In embodiments, the present techniques estimate an amount of degradation (e.g., wear and tear) experienced by the assembly. The estimate of degradation associated with one or more blades is transmitted as a control signal that indicates a condition of one or more blades.

Figure 8:
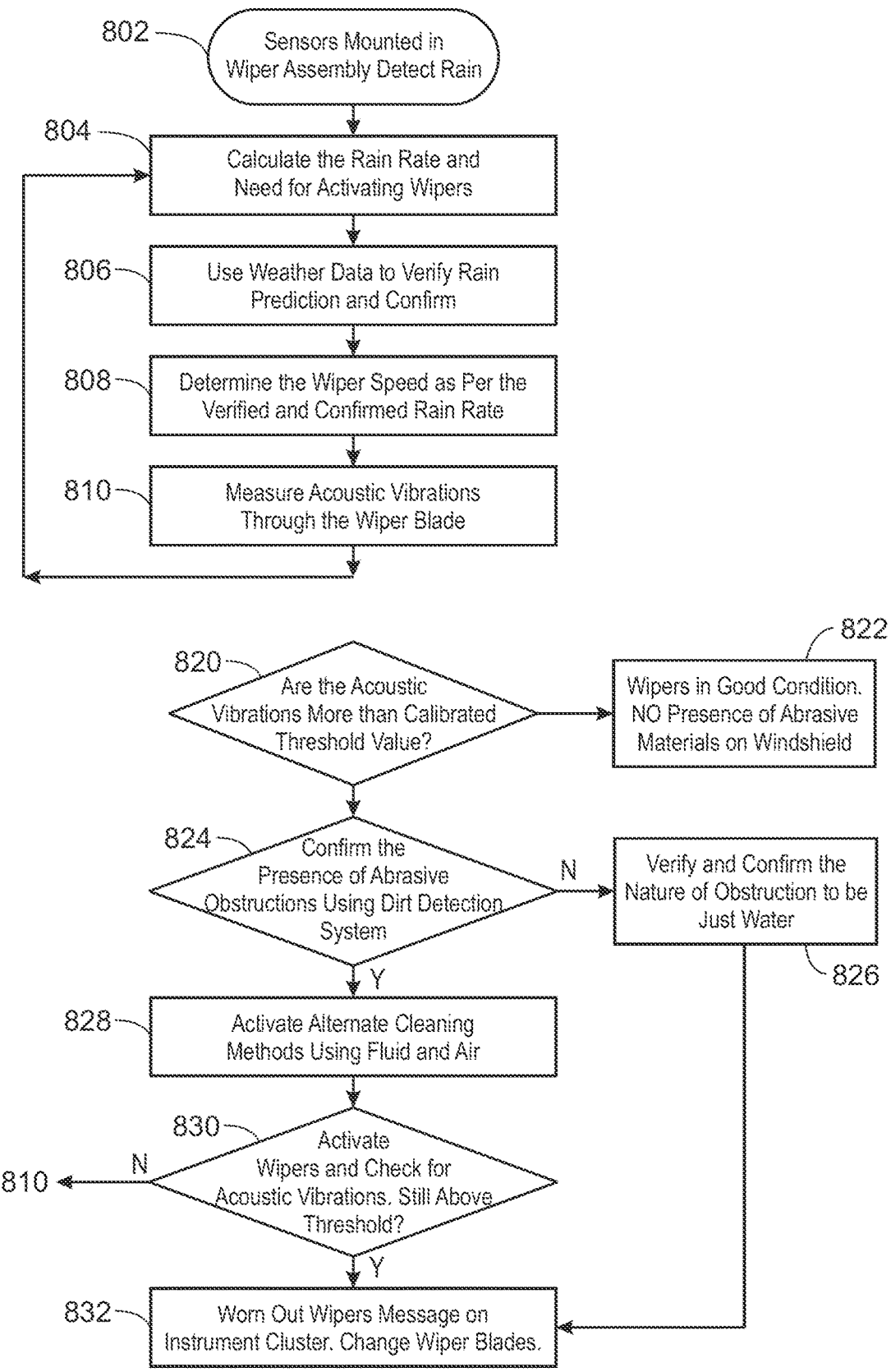
FIG. 8 is a process flow diagram of acoustic emission based wiper blade assembly control.

FIG. 8 is a process flow diagram of acoustic emission based wiper blade assembly control. In some aspects or embodiments, one or more steps described with respect to the process of FIG. 8 are performed (e.g., completely, partially, and/or the like) by one or more systems of an autonomous system of a vehicle (e.g., an autonomous system that is the same as or similar to autonomous system 202 of FIG. 2). Additionally, or alternatively, one or more steps of the process of FIG. 8 are performed (e.g., completely, partially, and/or the like) in addition to, or in conjunction with, a system that is different from an autonomous system (e.g., a drive by wire system that is the same as or similar to drive by wire system 202h of FIG. 2 or wiper blade assembly 600 of FIG. 6).

At block 802, sensors (e.g., piezoelectric sensors 604) mounted in the wiper blade assembly detect acoustic emissions. In examples, acoustic emissions captured by one or more sensors are used to calculate parameter, such as a rain rate. One or more acoustic emission sensors, typically an acoustic emission piezoelectric sensor, is mounted into the structure (e.g., arm) of the wiper blade assembly such that vibrations that travel into the rubber cleaning blade mounted onto the structure and are then transmitted into the acoustic emission sensor situated in the structure. Upon vibration on the windshield or optical surface due to rainfall, these vibrations travel throughout the windshield, into the wiper blade, and are then sensed by the acoustic emission sensor. With the use of multiple acoustic emission sensors (e.g. three or more), acoustic triangulation is used to map the vibration on the windshield to determine rain fall rates and rain levels (droplet size, frequency, and spread).

Accordingly, at block 804, one or more parameters associated with the environmental conditions are calculated. In the example of FIG. 8, the rainfall rate is calculated. Based on the calculated rainfall rate, a determination is made on if the wiper blades are to be activated based on the rainfall rate. A backup system is used to determine if the detected vibrations are the result of rainfall to eliminate several false positives as being detected rain. In embodiments, the backup system generally present on the vehicle (e.g., cameras 202a, LiDAR sensors 202b, radar sensors 202c, and microphones 202d of FIG. 2). In the example of FIG. 8, the backup system is a camera system (e.g., cameras 202a). In embodiments, the camera system includes cameras located on the exterior of the vehicle and cameras located inside the vehicle. If rain is detected by the backup system. Thus, at block 806, weather data is used to verify and confirm the prediction of rain. In embodiments, the weather data is third-party weather data that is extracted from other data sources, such as GPS data, AV compute (AV compute 400 of FIG. 4), or any other computing system.

At block 808, the wiper speed is determined based on the detected vibrations associated with rainfall as verified and confirmed by the backup system. At block 810, acoustic vibrations are measured through sensors integrated with the wiper blade assembly, and process flow returns to block 804 for continued calculation of rainfall rates and a corresponding wiper activation speed. In embodiments, rainfall rates are used to guide navigation of the vehicle. For example, operation of an autonomous vehicle is prevented under adverse or heavy rainfall rates. Additionally, LiDAR and camera sensor cleaning may be based on the calculated rainfall rates. In this manner, the present techniques can maintain sensor visibility in the presence of contaminants and debris in the environment.

Generally, while acoustic vibrations are measured through the wiper blade assembly, the acoustic vibrations are compared to a calibrated threshold value to determine a level of deterioration in wiper blade performance. In embodiments, upon activation of a wiper blade assembly, the acoustic emissions are measured to detect wear or degradation of the wiper blade through detected acoustic emission events. Upon detection of wear above the threshold, the blades may be return to a stowed position and other cleaning methods may be relied upon, such as water and air-based jets to remove contamination including abrasive particles like sand or desert dust. In embodiments, the present techniques are used in manually driven vehicles to prevent wiper-based activation to remove caked on dust which would abrasively wear the windshield.

Accordingly, the vibrations are also used to determine degradation of the wiper blade. At block 820 it is determined if the detected vibrations exceed a calibrated threshold value. In embodiments, the calibrated threshold value is dependent on a type of contaminant or debris known to be present in the particle collisions with the surface. For example, a contaminant detection system can be used to determine a composition of the current particle collisions with the surface. If it is determined that the acoustic vibrations are less than the calibrated threshold value, process flow continues to block 822. At block 822, it is determined that the wipers are in good condition. In particular the captured vibrations do not indicate the presence of abrasive materials on the surface.

At block 820, if it is determined that the captured acoustic vibrations are greater than the calibrated threshold value, process flow continues to block 824. At block 824, the presence of abrasive obstructions is determined using a dirt detection system. In embodiments, the dirt detection system calculates the type of contaminants present on a surface of the vehicle. Additionally, in embodiments the dirt detection system triggers a sensor cleaning cycle in response to contaminants or debris on a surface. The dirt detection system outputs if any contamination is present on the surface and also identifies the type of contamination on the sensor. If abrasive obstructions are not found on the surface, process flow continues to block 826. At block 826, the nature of the obstruction is confirmed to be water, and process flow continues to block 832 where a degradation message is generated.

If abrasive obstructions are found on the surface, process flow continues to block 828. At block 828, abrasive obstructions are confirmed and alternate cleaning methods are activated. In embodiments, the alternate cleaning methods include using fluid or air to clear the surface of abrasive obstruction. When an abrasive obstruction is present, wiping the obstruction using the wiper blade assembly could damage the wiper blade, the surface, or any combinations thereof. The alternate cleaning method clears abrasive obstructions that could damage the wiper blade, surface, and the like without further damage from cleaning.

The present techniques detect the presence of abrasive materials and measure wiper blade wear. A wear event is detected when the captured vibrations correspond to predetermined vibration patterns associated with a level of wear on the wiper blade. In examples, the wiper blades degrade over a time due to usage. The present techniques apply acoustic measurement and usage of alternate cleaning methods like fluid and air to restore functionality to the wiper blades. If indications of wear persists (e.g., vibrations above a calibrated threshold value), then the vibrations are attributed to a permanently worn-out wiper blade which needs to be replaced.

Accordingly, at block 830, wipers are activated and acoustic vibrations are sensed. If, after alternative cleaning methods, the acoustic vibrations are below a threshold, process flow continues to block 810, where acoustic vibrations are measured through the wiper blade as functionality has been restored to the wiper blade assembly. If the acoustic vibrations remain above the calibrated threshold value, process flow continues to block 832. At block 832, a degradation message is generated. In examples, the degradation message is an indicator or message displayed inside the vehicle. In examples, the degradation message is transmitted to a remote location.

For ease of description, the present techniques have been described using a wiper blade assembly as configured for cleaning a windshield surface of a vehicle. However the present techniques are also used to enable automatic cleaning cycles as applied to windshields, sensor covers, or other vehicle components through which light or other signals pass. For example, windshields, headlights, back lights, and sensors include large surfaces to which periodic cleaning increases visibility.

Figure 9:
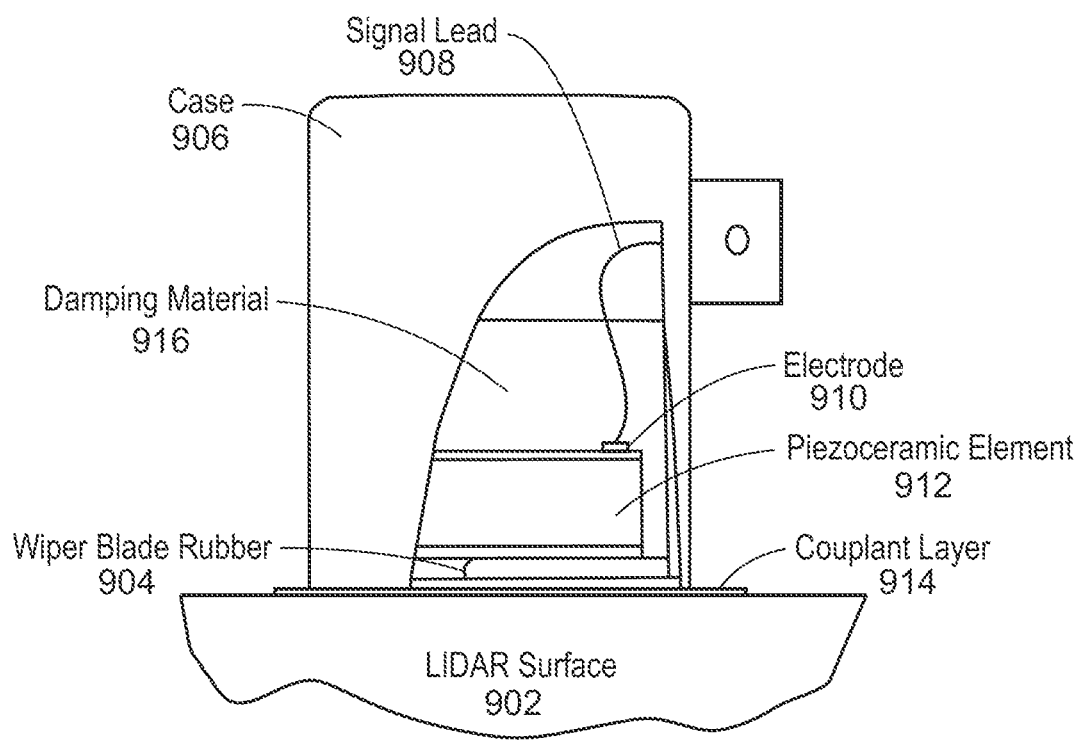
FIG. 9 is an illustration of a LiDAR assembly with a number of sensors.

FIG. 9 is an illustration of a LiDAR assembly 900 with a number of sensors.

In the example of FIG. 9, LiDAR surface 902 is illustrated. A wiper blade assembly 904 is in contact with a case or cover 906 that houses the LiDAR electronics. In examples, the LiDAR electronics include a signal lead 908, electrode 910, and a piezoceramic element 912. A couplant layer 914 and damping material 916 are also illustrated.

In the example of FIG. 9, the acoustic sensors are mounted in the wiper blades assembly in such a way that the acoustic element is present right after the wiper rubber area 904, which takes the vibration from LIDAR surface and is subject to degradation over time. In embodiments, the present techniques use a wiper blade to remove dirt or other contamination from the case 906 (e.g., surface). In embodiments, the present techniques can also determine contamination levels associated with the LiDAR case 906. Traditionally, for a given sensor a cleaning system senses when the sensor field of view becomes obstructed or otherwise contaminated. In response to contamination, the cleaning system is activated. The cleaning system may include, for example, a wash or spray. The present techniques are able to calculate a rainfall rates or a percentage of obstruction or contamination of surfaces associated with the sensor, a trigger a cleaning cycle for that particular sensor.

Figure 10:
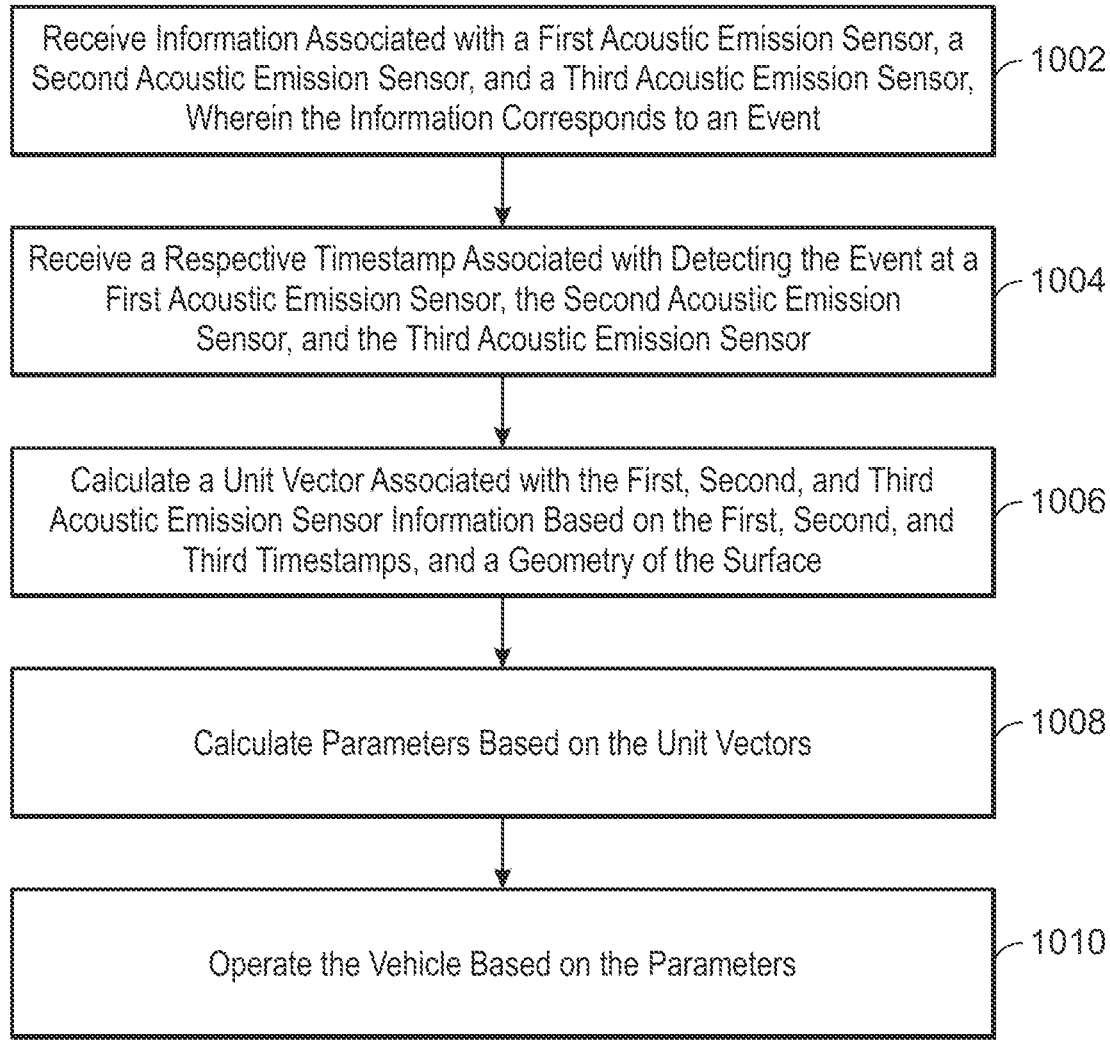
FIG. 10 is a block diagram of a process for acoustic emission based device control.

FIG. 10 is a block diagram of a process for acoustic emission based device control. In examples, the device is a cleaning device such as a wiper blade assembly, air jets, heating/cooling/defrost, and the like. In some aspects or embodiments, one or more of the steps described with respect to process 1000 are performed (e.g., completely, partially, and/or the like) by an autonomous system of a vehicle (e.g., an autonomous system that is the same as or similar to autonomous system 202 of FIG. 2). Additionally, or alternatively, one or more steps of the process 1000 are performed (e.g., completely, partially, and/or the like) in addition to, or in conjunction with, a system that is different from an autonomous system (e.g., a drive by wire system that is the same as or similar to drive by wire system 202h of FIG. 2 or wiper blade assembly 600 of FIG. 6).

At block 1002, information associated with a first acoustic emission sensor, a second acoustic emission sensor, and a third acoustic emission sensor is received. In embodiments, the information corresponds to an event (e.g., an event is a collision of particles with the surface). Generally, the acoustic emissions output by the first acoustic emission sensor, the second acoustic emission sensor, and the third acoustic emission sensor are used to determine degradation of a wiper blade assembly.

At block 1004, a first timestamp (e.g., time at which a valid event (collision between particles and the vehicle surface) is detected from a timing system) associated with the first acoustic emission sensor information is received, second timestamp associated with the second acoustic emission sensor information received, and third timestamp associated with the third acoustic emission sensor information is received.

At block 1006, in accordance with the first, second, and third acoustic emission sensor information, the first, second, and third timestamps, and a geometry of the surface, a unit vector is calculated from each acoustic emission sensor in the direction of the event's origin (e.g., location where the particle collided with the surface).

At block 1008, parameters associated with environmental conditions are calculated based on the unit vectors (e.g., droplet size, droplet spacing, rain rate, droplet removal rate, debris). In embodiments, the acoustic emission sensor information and unit vectors are used to estimate an amount of degradation present at the wiper blade assembly.

At block 1010, a control system (e.g., control system 408 of FIG. 4, control system 504b of FIG. 5) is configured to operate the vehicle based upon the parameters. A control system is configured to operate the vehicle based upon the parameters. In examples, an AV including a wiper blade assembly as described herein operates for an extended period of time without physical, visual human inspection. During these periods of time, surface damage or obstruction can occur. The present techniques detect surface damage or obstructions, and control operation of the wiper blade assembly based on the detected surface damage or obstructions.

In some examples, the wiper blade assembly is operated based on an estimated amount of degradation indicating a condition of a blade of the wiper blade assembly. In response to a wiper blade being degraded beyond a predetermined threshold amount, the AV is operated using alternative cleaning methods. In embodiments, the detected acoustic emission information enables a determination of environmental conditions and degradation of a wiper blade assembly using information captured at the AV. In particular, the determination of environmental conditions at the AV enables real-time, fine control of AV systems in response to the determined environmental conditions. Further, determining the degradation of a wiper blade assembly enables mitigation techniques to be applied, even when the degradation is unnoticeable to humans.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed:

1. A vehicle, comprising:
   acoustic emission sensors configured to detect vibrations generated from particles that collide with a surface of the vehicle, wherein a first acoustic emission sensor is at a first position on an arm of a wiper blade assembly, a second acoustic emission sensor is at a second position on the arm, and a third acoustic emission sensor is at a third position on the arm;
   at least one computer-readable medium storing computer-executable instructions;
   at least one processor communicatively coupled to the acoustic emission sensors and configured to execute the computer executable instructions, the execution carrying out operations including:
      receiving first acoustic emission sensor information from the first acoustic emission sensor, second acoustic emission sensor information from the second acoustic emission sensor, and third acoustic emission sensor information from the third acoustic emission sensor corresponding to an event;
      receiving a first timestamp associated with the first acoustic emission sensor information, second timestamp associated with the second acoustic emission sensor information, and third timestamp associated with the third acoustic emission sensor information;
      in accordance with the first, second, and third acoustic emission sensor information, the first, second, and third timestamps, and a geometry of the surface, calculating a unit vector from each acoustic emission sensor in the direction of an origin of the event; and
      calculating parameters associated with environmental conditions based on the unit vectors; and
   a control system communicatively coupled to the at least one processor, wherein the control system is configured to operate the vehicle based upon the parameters.

2. The vehicle of claim 1, the operations comprising, upon activation of the arm, determining an abrasive wear status of a blade associated with the wiper blade assembly based on the first acoustic emission sensor information, the second acoustic emission sensor information, and the third acoustic emission sensor information.

3. The vehicle of claim 1, further comprising another control system to operate the wiper blade assembly based on upon the parameters.

4. The vehicle of claim 1, wherein calculating parameters is based on triangulation applied to the first acoustic emission sensor information, the second acoustic emission sensor information, and the third acoustic emission sensor information.

5. The vehicle of claim 1, wherein the first timestamp, the second timestamp, and the third timestamp are obtained from a timing system.

6. The vehicle of claim 1, wherein the operations comprise controlling a speed of the wiper blade assembly based on the parameters associated with environmental conditions.

7. The vehicle of claim 1, wherein the operations comprise verifying the calculated parameters via a comparison with weather data.

8. The vehicle of claim 1, wherein the operations comprise determining a particle type based on the first acoustic emission sensor information, second acoustic emission sensor information, and third acoustic emission sensor information.

9. The vehicle of claim 8, wherein the operations comprise implementing an alternative cleaning technique in response to determining an abrasive particle type has collided with the surface.

10. A method comprising:
    detecting, with at least one processor, vibrations generated from particles that collide with a surface of a vehicle, wherein a first acoustic emission sensor is at a first position on an arm of a wiper blade assembly, a second acoustic emission sensor is at a second position on the arm, and a third acoustic emission sensor is at a third position on the arm;
    receiving, with the at least one processor, first acoustic emission sensor information from the first acoustic emission sensor, second acoustic emission sensor information from the second acoustic emission sensor, and third acoustic emission sensor information from the third acoustic emission sensor corresponding to an event;

receiving, with the at least one processor, a first timestamp associated with the first acoustic emission sensor information, second timestamp associated with the second acoustic emission sensor information, and third timestamp associated with the third acoustic emission sensor information, in accordance with the first, second, and third acoustic emission sensor information, the first, second, and third timestamps, and a geometry of the surface, calculating, with the at least one processor, a unit vector from each acoustic emission sensor in a direction of an origin of the event;

calculating, with the at least one processor, parameters associated with environmental conditions based on the unit vectors; and operating, with the at least one processor, the vehicle based upon the parameters.

11. The method of claim 10, comprising determining an abrasive wear status of a blade associated with the wiper blade assembly based on the first acoustic emission sensor information, the second acoustic emission sensor information, and the third acoustic emission sensor information.

12. The method of claim 10, wherein calculating parameters is based on, at least in part, triangulation applied to the first acoustic emission sensor information, the second acoustic emission sensor information, and the third acoustic emission sensor information.

13. The method of claim 10, wherein the first timestamp, the second timestamp, and the third timestamp are obtained from a timing system.

14. The method of claim 10, comprising controlling a speed of the wiper blade assembly based on the parameters associated with environmental conditions.

15. The method of claim 10, comprising verifying the calculated parameters via a comparison with weather data.

16. The method of any of claim 10, comprising determining a particle type based on the first acoustic emission sensor information, second acoustic emission sensor information, and third acoustic emission sensor information.

17. The method of claim 16, comprising implementing an alternative cleaning technique in response to determining an abrasive particle type has collided with the surface.

18. A non-transitory computer-readable storage medium comprising at least one program for execution by at least one processor of a first device, the at least one program including instructions which, when executed by the at least one processor, cause the first device to:

detect vibrations generated from particles that collide with a surface of a vehicle, wherein a first acoustic emission sensor is at a first position on an arm of a wiper blade assembly, a second acoustic emission sensor is at a second position on the arm, and a third acoustic emission sensor is at a third position on the arm;

receive first acoustic emission sensor information from the first acoustic emission sensor, second acoustic emission sensor information from the second acoustic emission sensor, and third acoustic emission sensor information from the third acoustic emission sensor corresponding to an event;

receive a first timestamp associated with the first acoustic emission sensor information, second timestamp associated with the second acoustic emission sensor information, and third timestamp associated with the third acoustic emission sensor information, in accordance with the first, second, and third acoustic emission sensor information, the first, second, and third timestamps, and a geometry of the surface, calculate a unit vector from each acoustic emission sensor in the direction of an origin of the event;

calculate parameters associated with environmental conditions based on the unit vectors; and operate the vehicle based upon the parameters.

19. The non-transitory computer-readable storage medium of claim 18, comprising determining an abrasive wear status of a blade associated with the wiper blade assembly based on the first acoustic emission sensor information, the second acoustic emission sensor information, and the third acoustic emission sensor information.

20. The non-transitory computer-readable storage medium of claim 18, wherein calculating parameters is based on, at least in part, triangulation applied to the first acoustic emission sensor information, the second acoustic emission sensor information, and the third acoustic emission sensor information.

* * * * *